Aug. 30, 1949.  C. A. PORTER  2,480,766
PLASTICIZED POLYVINYL ALCOHOL COMPOSITIONS
Filed April 12, 1947
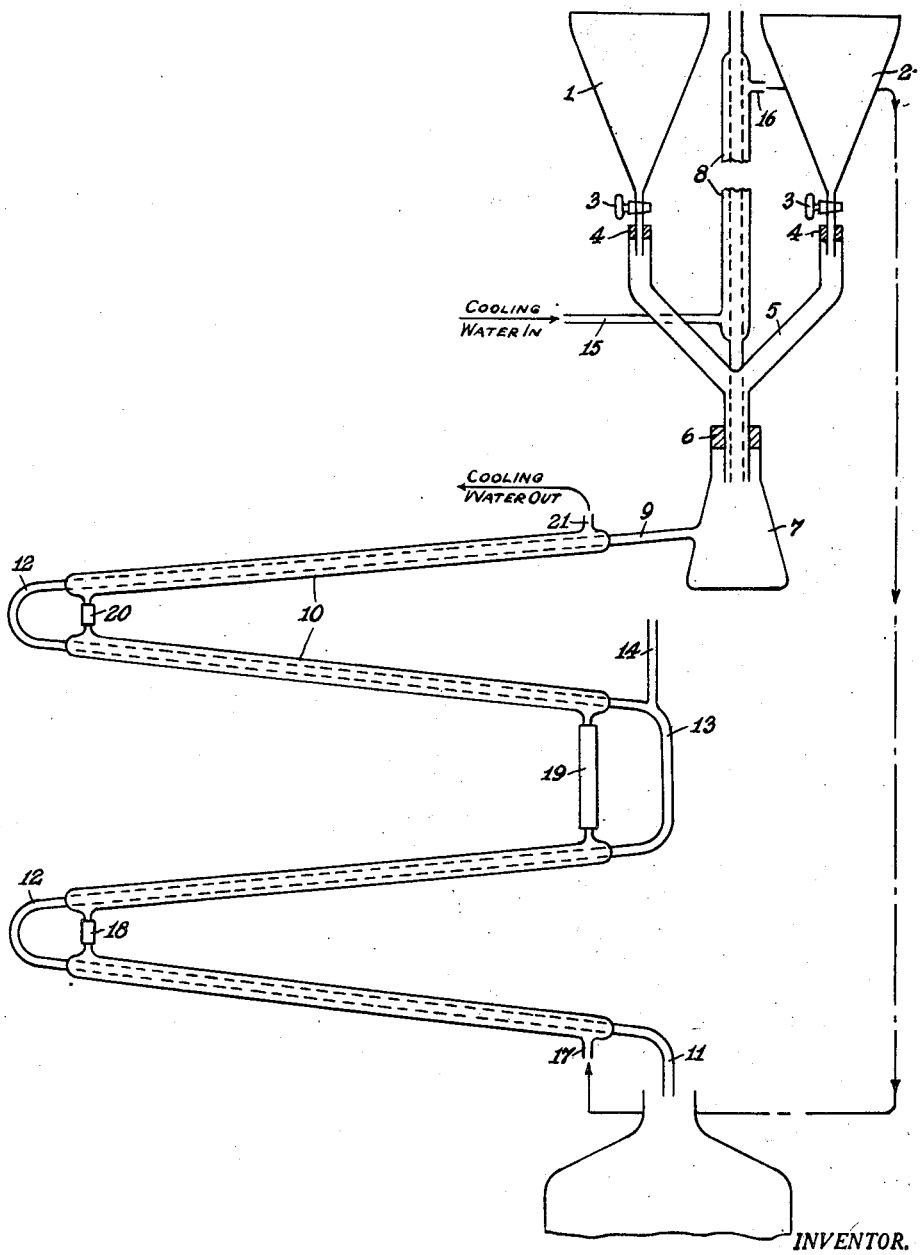
INVENTOR.
CHARLES A. PORTER
BY
ATTORNEYS Patented Aug. 30, 1949

2,480,766

UNITED STATES PATENT OFFICE 2,480,766

PLASTICIZED POLYVINYL ALCOHOL COMPOSITIONS

Charles Arthur Porter, Belleville, N. J., assignor to Resistoflex Corporation, Belleville, N. J., a corporation of New York Application April 12, 1947, Serial No. 741,119

6 Claims. (Cl. 260—32.6)

This invention relates to polyvinyl alcohol compositions and more particularly to polyvinyl alcohol modified with reaction products of diethanolamine and hydrochloric acid.

As is known, polyvinyl alcohol is a water soluble material capable of being formed with the aid of solvents or plasticizers or both, into tough flexible articles such as tubes, bands, films, sheets, threads and the like, serving various uses.

The principal objects of the present invention are to improve the properties of polyvinyl alcohol compositions by reducing their solubility or swelling in water, increasing flexibility and the retention thereof at elevated temperatures, improving tensile strength and increasing electrical conductivity. Another object is to improve the extrudability or flowing properties and molding characteristics of the compositions. Another object is to provide improved plasticizers for polyvinyl alcohol. A further object is to improve the stability of plasticized polyvinyl alcohol compositions.

The invention, broadly, resides in the use, as plasticizer or modifying agent for polyvinyl alcohol, of reaction products of diethanolamine and hydrochloric acid. In its more specific aspects the invention resides in the discovery that the desired improvements result from the use of such reaction products in excess of certain minimum amounts and the further discovery that the best results are obtained when the reaction products are produced in a particular way.

Since the exact nature of the reaction products is not known and since they obviously differ in accordance with the conditions of their formation, their preparation will be described in conjunction with the drawing which shows, more or less schematically, one form of apparatus in which the reaction products may be produced.

Referring to the single figure of the drawing, 1 and 2 are separatory funnels or the like equipped with stop cocks 3 inserted in vented stoppers 4 in the tops of the two branches of a Y-tube 5. This tube is inserted through a stopper 6 in the top of a reaction flask 7 which is equipped with a reflux condenser 8. Fluid in the flask 7, in excess of a predetermined quantity, flows out through a delivery tube 9 and passes through a series of heat exchangers 10 to the discharge pipe 11. The heat exchangers are connected in series at their ends by conduits 12 and 13, the latter, which connects the second and third heat exchangers, being provided with a vent tube 14 open at its upper end to equalize pressure throughout the apparatus.

Cooling water is introduced into the bottom of the condenser 8 through pipe 15, leaves through the outlet 16 and is conducted into the bottom heat exchanger through the inlet 17, passing upwardly through the heat exchangers which are interconnected by hose sections 18, 19 and 20. The cooling water leaves the system through the outlet 21 of the uppermost condenser.

Reaction product is produced by filling one of the funnels, for example 1, with diethanolamine and the other funnel 2 with concentrated hydrochloric acid. The feed of these two ingredients is controlled by the stop cocks 3 so that they flow through the legs of the Y-tube 5 and are blended in the lower duct thereof falling into the flask 7. By controlling the ratios of the reactants, the pH of the reaction product may be controlled. The reaction is exothermic and the temperature may be regulated by controlling the quantity of the materials being reacted. pH may be determined by sampling the reaction product through the vent 14 and the temperature may be determined by suitable apparatus associated with the flask 7.

It has been discovered that the recation products have very different effects, when used in polyvinyl alcohol compositions, depending upon whether they are formed in a reaction conducted on the acid side or on the alkaline side and depending upon the temperature at which the reaction takes place. It has also been found that very different results are obtained in using final products which are acid or alkaline or those which have been neutralized after formation, for example, by additions of diethanolamine or hydrochloric acid.

While the reaction products, in general, are possessed of utility as plasticizers for polyvinyl alcohol, it has been determined that the best results from the standpoint of water resistance, stability at elevated temperatures, increased electrical conductivity and lack of blistering in the compositions during molding and extrusion are obtained by the use of a product which is substantially neutral. Neutralization of the reaction product may be carried out, when it is on the acid side, by the addition of amino alcohols other than diethanolamine. Among others, monoethanolamine, and tris hydroxy methyl amino methane have been found most satisfactory. Others which may be used are triethanolamine, 2 amino-1-propanol, 2 amino-1-butanol, 2 amino-2-methyl-1-3-propanediol, and 2 amino-2-ethyl-1-3-propanediol.

Even though the reaction product is neutralized before use in the polyvinyl alcohol compositions, it has been found that the molding characteristics and extrudability of such compositions varies in a significant manner, depending upon whether the reaction takes place under acid or alkaline conditions and on the temperature of reaction. Least satisfactory was the product produced under acid conditions at a pH of from 5.5 to 6.5 and at a sufficiently slow rate so that the temperature at which the reaction took place was not much above 70° F. More favorable results were obtained by the reaction product resulting from reaction at room temperature at a pH of from 7.5 to 8.5. Greatly superior results were obtained, however, in using as a plasticizer or modifying agent a product obtained by adjusting the feed so that the reaction took place at a temperature of between 200 and 220° F. at a pH of 5.5 to 6.5. All of the above reaction products were neutralized to a pH of approximately 7.0 before use. As a result of a large number of tests, it appears that the optimum conditions of reaction are a temperature of about 210° F. and a pH of 6.5.

The reaction products thus produced contain water so that they are, in effect, aqueous solutions of from 65% to 70% of the reaction product. Computing the quantity to be used in conjunction with polyvinyl alcohol without regard to the water, the minimum amount to attain the above stated objects has been found to be about 40% by weight based on the polyvinyl alcohol in the composition. Utilizing an approximately 67% solution of the reaction product, the minimum amount is about 60%.

Polyvinyl alcohol compositions have heretofore been plasticized with numerous materials and mixtures thereof, including water, glycerol, diethanolamine, triethanolamine, ethanol formamide, formamide, ethanol acetamide and various glycols. In such compositions, various grades of polyvinyl alcohol may be used ranging in percentage of saponification from 76% to 100% saponified and having viscosities ranging from 4 to 55 centipoises, as measured on a 4% aqueous solution at 20° C.

With any such polyvinyl alcohols, and with or without the conjoint use of such other known plasticizers, it has been found that use of the reaction products above described brings about improvements in heat resistance, water resistance, electrical conductivity and dimensional stability. The upper limit of usefulness of the reaction product is determined only by the point at which excessive exudation takes place, and this in turn varies with the type of polyvinyl alcohol used and the other ingredients which may be present.

In the production of such items as tubes, bands, threads, etc., the flow characteristic or extrudability is extremely important. Certain polyvinyl alcohol grades offer serious problems with respect to extrudability when using such known plasticizers as water, glycerol, ethanol formamide, formamide, etc. alone or in admixture. Extrudability is not simply measured in rate per hour because acceptability of the product also depends on other factors such as blistering, homogeneity, uniformity and the like. In extruding polyvinyl alcohol compositions containing heretofore known plasticizers the temperature range between the sintering or complete fusion temperature and the temperature at which blistering or foam becomes evident is so small, in most cases, that the problem of extrusion becomes very difficult. Polyvinyl alcohol tubing and other extruded objects must be completely sintered or fused to lend maximum water resistance, tensile strength, heat resistance, cold resistance, etc., to the product. Blisters or foam obviously cannot be tolerated. By use of the reaction products of the invention this temperature range is considerably broadened.

The following examples illustrate the improvements obtained in extrudability through use of the diethanolamine-hydrochloric acid reaction products.

*Example 1*

A composition containing, parts by weight, 100 parts polyvinyl alcohol (98.5% saponified medium viscosity of 18–28 centipoises), 40 parts water, 40 parts glycerol, 60 parts ethanol formamide, was extruded as tubing. Increased plasticizer generally increases flow tendencies or extrudability and the above composition is overplasticized. In spite of this extrusion was poor because extrusion rate was slow, 500 f. p. h., the tubing was alternately unsintered or blistered, and the tensile strength was poor (about 800 p. s. i.).

*Example 2*

A composition containing, parts by weight, 100 parts of the same polyvinyl alcohol used in Example 1 and 130 parts of diethanolamine-hydrochloric acid reaction product (about 67% solution) prepared at 70–80° F. at a pH of 5.5–6.5, and finally neutralized to a pH of 7.0 with diethanolamine, was extruded as tubing. Extrusion characteristics were very good as evidenced by an extrusion rate of 800–900 f. p. h., excellent appearance of tubing as to uniformity, translucency, complete sintering and freedom from blistering, excellent tensile strength (about 3000 p. s. i.), and consistent and continuous ease of extrusion.

*Example 3*

A composition containing, parts by weight, 100 parts of the polyvinyl alcohol of Example 1 and 90 parts of the diethanolamine-hydrochloric acid reaction product of Example 2, 30 parts tetrahydrofurfuryl alcohol, and 20 parts formaldehyde (37%), was extruded as tubing. For this composition the extrusion rate was 550 f. p. h., tubing was slightly rough and exhibited tendency to incomplete sintering, the color was light yellow, and tensile strength was fair (about 2000 p. s. i.). The overall evaluation of the result was fair. This composition and those of Examples 4 and 5 are to be compared with respect to extrusion characteristics, to show how reaction products of diethanolamine and hydrochloric acid prepared by different reaction techniques produced different results.

*Example 4*

A composition containing, parts by weight, 100 parts of the polyvinyl alcohol of Example 1, 90 parts diethanolamine-hydrochloric acid reaction product (about 67% solution) prepared at 70–80° F. at a pH 7.5–8.5, slow rate, and neutralized to a pH of 7.0 with hydrochloric acid, 30 parts tetrahydrofurfuryl alcohol, and 20 parts formaldehyde (37%) was extruded as tubing. Extrusion was characterized by an extrusion rate of 600 f. p. h., slightly rough tubing but completely sintered, dark color, and tensile strength of about 2500 p. s. i. The overall evaluation was that results with the reaction product produced as above on the alkaline side showed an improvement over the results in Example 3 where the reaction product was formed on the acid side, in which the composition was otherwise the same.

Example 5

A composition containing, parts by weight, 100 parts of the polyvinyl alcohol of Example 1, 90 parts diethanolamine-hydrochloric acid reaction product (about 67% solution) prepared at 200–220° F. at a pH of 5.5–6.5, fast rate, and neutralized to a pH of 7.0 with diethanolamine, 30 parts tetrahydrofurfuryl alcohol and 20 parts formaldehyde, was extruded as tubing. Extrusion was at the rate of 700 f. p. h., the tubing was completely sintered, smooth and uniform, color was dark, and tensile strength was about 3000 p. s. i.

The tensile strengths referred to above are approximations, being determined shortly after extrusion without an attempt to standardize the conditions of testing.

The results of Examples 3, 4 and 5 indicate that the technique for preparing the diethanolamine-hydrochloric acid reaction product described in Example 5 yields the best results with respect to extrusion. Further tests have shown that a reaction temperature of 140° F. is about the minimum below which extrusion results become similar to those shown in Examples 3 and 4.

The different techniques of preparing the reaction products, described in Examples 3, 4 and 5, produced no significant differences in their effects on cold resistance, heat resistance, water resistance and electrical conductivity.

Other tests have shown that the effects on extrusion, as noted in Examples 3, 4 and 5, are similar in polyvinyl alcohol compositions which do not contain aldehydes or tetrahydrofurfuryl alcohol, these ingredients having been included for the purpose of reducing exudation in the resulting product.

Example 6

This example illustrates the effect of the final pH of the diethanolamine-hydrochloric acid reaction product, which pH is adjusted after the reaction product is formed. Compositions were made consisting of 100 parts by weight of the polyvinyl alcohol used in Example 1, 90 parts of reaction product (about 67% solution) prepared at 200–220° F. at a pH of 5.5–6.5 (and finally adjusted after preparation to the pH stated below), 30 parts of tetrahydrofurfuryl alcohol and 20 parts formaldehyde (37%). The pH adjustments of the reaction product were as follows:

(a) to a pH of 4.0 by addition of hydrochloric acid;
(b) to a pH of 6.8 by addition of diethanolamine;
(c) to a pH of 7.8 by addition of diethanolamine.

The compositions containing each of these adjusted reaction products were formed into tubing by extrusions and into sheets by molding. The working properties of the compositions were compared and the shaped products tested for various properties with the following results:

(1) On extrusion product (a) gave the highest rate but showed a slight tendency toward blistering whereas product (b) had nearly as high a rate, gave smooth uniform tubing and was free from blisters. Product (c) gave the slowest extrusion and the tubing was rough. The substantially neutral product was therefore the best so far as extrusion was concerned. From this standpoint it has been found that the pH should not be lower than 6.5

(2) Water resistance of the formed products was tested by measuring weight increase and residual tensile strength after 24 hours immersion in water at room temperature with the following results, which are averages of numerous tests:

| Product | (a) | (b) | (c) |
|---|---|---|---|
| Per cent weight increase | 86 | 78 | 79 |
| Tensile strength in p. s. i | 400 | 430 | 420 |

It will be observed that the substantially neutral product (b) gave the best results and the alkaline product (c) the next best.

(3) Heat resistance, or retention of flexibility at elevated temperatures, measured by flexing test specimens after varied periods of exposure to hot oil at 250° F. until they broke, showed the duration of flexibility for the different compositions to be: (a) 293 hrs. (b) 330 hrs. (c) 367 hrs.

(4) Cold resistance, tested by flexing test specimens under standard conditions at progressively lower temperatures until broken gave the following results (°F.); (a) −80, (b) −76, (c) −76.

(5) The electrical resistivity measured on a 10 foot length of hose, after aging for 24 hours at 140° F. was as follows (megohms) (a) 50, (b) 40, (c) 75. The neutral product was the best from this standpoint.

As shown by the above evaluations, the most important overall improvements result from the use of reaction products finally adjusted to a substantially neutral or alkaline condition.

Example 7

This example illustrates the effect of using various amounts of the reaction product of the invention as plasticizer in a polyvinyl alcohol composition. Compositions were made up containing 100 parts by weight of polyvinyl alcohol (which was a blend of 80 parts of 98.5% saponified medium viscosity polyvinyl alcohol and 20 parts of 91–94% saponified medium viscosity polyvinyl alcohol), 30 parts of tetrahydrofurfuryl alcohol and the amounts of the diethanolamine-hydrochloric acid reaction product of Example 5 (used as a solution of about 67%) set forth in the headings of the following table which shows the properties of the resulting compositions.

| Parts by weight Reaction Product | 130 | 100 | 80 | 60 | 40 |
|---|---|---|---|---|---|
| Heat Resistance Index, hours | 228 | 180 | 108 | 60 | 24 |
| Cold Resistance, °C | −35 | −30 | −25 | −25 | −20 |
| Electrical Resistivity, Megohms | 1.8 | 2.8 | 5.5 | 10.5 | 20.0 |
| Water Resistance Percent Weight increase | 129 | 138 | 126 | 142 | 155 |
| Flow | Excellent | Very Good | Good | Fair | Poor |

Example 8

This example shows the comparative results of substituting for well known mixed plasticizers for polyvinyl alcohol, so that total plasticizer content was the same in each case, various amounts, ranging from 0 to 100% of the reaction product described in Example 5. The basic composition in which the substitutions were made was as follows:

| | Parts |
|---|---|
| Polyvinyl alcohol (98.5% saponified medium viscosity) | 100 |
| Glycerol | 40 |
| Formamide | 10 |
| Tetrahydrofurfuryl alcohol | 20 |
| Water | 30 |

Substitutions for the plasticizer mixture in the above compositions were made in the amounts indicated in the following table:

| Composition | Mixed Plasticizers | Reaction Product |
|---|---|---|
| | Percent | Percent |
| (a) | 0 | 100 |
| (b) | 20 | 80 |
| (c) | 40 | 60 |
| (d) | 60 | 40 |
| (e) | 80 | 20 |
| (f) | 100 | 0 |

Molded sheets were made from these compositions and tested, as described above in Example 6, with the following results:

| Composition | (a) | (b) | (c) | (d) | (e) | (f) |
|---|---|---|---|---|---|---|
| Heat Resistance Index, hrs | 144 | 108 | 96 | 48 | 24 | 24 |
| Cold Resistance, °C | −30 | −30 | −25 | −25 | −25 | −25 |
| Electrical Resistivity, Megohms | 2.4 | 2.7 | 3.8 | 5.5 | 15.0 | 76.0 |
| Water Resistance,[1] (p. s. i) | 1,580 | 1,480 | 1,410 | 1,350 | 1,010 | 1,050 |

[1] Residual tensile strength after immersion in water 24 hours at 70° F.

Inspection of the above results shows that the best results were obtained in composition (a) in which a solution of the reaction product was the sole plasticizer.

One important use of polyvinyl alcohol tubing is in oil lines used on internal combustion engines where they are subjected to elevated temperatures and good heat resistance is necessary in such applications. Product (c) in the above table, which contains 60% of the reaction product (as a 67% solution), has the lowest heat resistance index, among the products shown in the table, which can be tolerated in products intended for such use. A heat resistance index lower than about 60, by correlation with actual field tests, indicates that the tubing will not stand up satisfactorily in such use. Therefore, as may be seen from Examples 7 and 8, where the composition is used in articles which require heat resistance, the minimum amount (based on the polyvinyl alcohol) of the reaction product to be used for satisfactory results is about 60% of the approximately 67% solution, or about 40% calculated on a dry basis.

While in Example 8 the reaction product of diethanolamine and hydrochloric acid was substituted for a particular combination of known plasticizers, similar substitution tests have been conducted with respect to other plasticizers and mixtures thereof including the following, each used with 100 parts of polyvinyl alcohol: 40 parts of glycerol and 40 parts of water; 40 parts of glycerol, 20 parts of formamide and 20 parts of water; 40 parts of glycol and 40 parts of water; 60 parts of ethanol formamide; 60 parts of ethanol acetamide; 60 parts of diethanolamine; and 60 parts of triethanolamine. In each case, substitution of the reaction product for the other plasticizer or plasticizers in an amount equal to at least 40 parts (dry basis) based on the polyvinyl alcohol, resulted in a great improvement in flowing properties and extrudability, appreciable increase in heat resistance, and improvement in water resistance and electrical conductivity.

Electrical conductivity is of interest because in certain applications, for example in the manufacture of curb pump hose for handling gasoline, it is desirable that the hose be as conductive as possible to prevent the accumulation of static electricity.

The reaction product of the invention has also been used, in a manner comparable to the foregoing examples, in compositions made with a wide variety of different grades of polyvinyl alcohol having different degrees of saponification and viscosity, and mixtures of such grades. The improvements in the results, using the reaction product as a plasticizer, have been found to be general with respect to all grades of polyvinyl alcohol and are not specific to any particular grade.

In the foregoing examples the novel plasticizer of the invention was produced by reacting diethanolamine and hydrochloric acid alone. It has further been discovered however, that beneficial results similar to those illustrated by the foregoing examples may be obtained by reacting the diethanolamine in admixture with other plasticizers for polyvinyl alcohol, including other amino alcohols, with hydrochloric acid, neutralizing the reaction product as taught in the foregoing examples. For example, reaction product has been produced by reacting equal parts of monoethanolamine and diethanolamine with hydrochloric acid under the conditions described in Example 2, and subsequently neutralizing this product. The results of using this combined product as a plasticizer were superior to those produced by the conjoint use of products produced by the separate reaction of monoethanolamine and hydrochloric acid and diethanolamine and hydrochloric acid. Similarly, a reaction product was produced by reacting an admixture of equal parts of monoethanolamine, diethanolamine and tetrahydrofurfuryl alcohol with hydrochloric acid. The results of using this composition were again better than those produced by the conjoint use of the separately formed reaction products of the two amino alcohols, combined after formation with tetrahydrofurfuryl alcohol. Another admixture reacted with hydrochloric acid consisted of one part of monoethanolamine, one part of diethanolamine and two parts of ethanol formamide, and still another added to the just mentioned ingredients two parts of tetrahydrofurfuryl alcohol. Plasticizers prepared in this manner all showed improvements over known plasticizers, particularly with respect to increased heat resistance and increased tensile strength. Therefore, the invention is to be construed as including the use of reaction product formed in all of these different ways.

While the invention has been illustrated above by reference to specific examples, it is to be understood that they are merely illustrative of the invention which is to be construed broadly within the purview of the claims.

What is claimed is:

1. A composition comprising polyvinyl alcohol and the product formed by the reaction of diethanolamine and hydrochloric acid at a pH of from 5.5 to 8.5 and at a temperature between room temperature and 220° F., said product being brought to a pH of from 6.5 to 7.8 before incorporation in said alcohol, said product being present in an amount, based on said alcohol, of from 60% by weight of a 67% solution to that amount which would cause exudation of plasticizer from said composition.

2. A composition comprising polyvinyl alcohol and the product formed by the reaction of diethanolamine and hydrochloric acid at a pH of from 5.5 to 6.5 and at a temperature between room temperature and 220° F., said product being brought to a substantially neutral condition by addition of monoethanolamine before incorporation in said alcohol, said product being present in an amount, based on said alcohol, of from 60% by weight of a 67% solution to that amount which would cause exudation of plasticizer from said composition.

3. A composition comprising polyvinyl alcohol and the product formed by the reaction of diethanolamine and hydrochloric acid at a pH of from 5.5 to 6.5 and at a temperature between room temperature and 220° F., said product being brought to a substantially neutral condition by addition of diethanolamine before incorporation in said alcohol, said product being present in an amount, based on said alcohol, of from 60% by weight of a 67% solution to that amount which would cause exudation of plasticizer from said composition.

4. A composition comprising polyvinyl alcohol and the product formed by the reaction of diethanolamine and hydrochloric acid at a pH of from 5.5 to 6.5 and at a temperature between room temperature and 220° F., said product being brought to a substantially neutral condition by addition of tris hydroxy methyl amino methane before incorporation in said alcohol, said product being present in an amount, based on said alcohol, of from 60% by weight of a 67% solution to that amount which would cause exudation of plasticizer from said composition.

5. A composition comprising polyvinyl alcohol and the product formed by the reaction of diethanolamine and hydrochloric acid at a pH of from 5.5 to 6.5 and at a temperature between 140° and 220° F., said product being brought to a pH of from 6.5 to 7.8 before incorporation in said alcohol, said product being present in an amount, based on said alcohol, of from 60% by weight of a 67% solution to that amount which would cause exudation of plasticizer from said composition.

6. A composition comprising polyvinyl alcohol and the product formed by the reaction of diethanolamine and hydrochloric acid at a pH of from 5.5 to 6.5 and at a temperature between 200° and 220° F., said product being brought when cool to a pH of from 6.5 to 7.8 before incorporation in said alcohol, said product being present in an amount, based on said alcohol, of from 60% by weight of a 67% solution to that amount which would cause exudation of plasticizer from said composition.

CHARLES ARTHUR PORTER.

REFERENCES CITED

The following references are of record in the file of this patent:

UNITED STATES PATENTS

| Number | Name | Date |
|---|---|---|
| 2,250,664 | Watkins | July 29, 1941 |